United States Patent [19]
Woodall

[11] Patent Number: 5,218,365
[45] Date of Patent: Jun. 8, 1993

[54] BEACON INTERROGATOR BEAMWIDTH CONTROL USING SIDELOBE SIGNAL INTEGRATION IN TRANSPONDERS

[75] Inventor: Phillip J. Woodall, Baltimore, Md.

[73] Assignee: Allied-Signal Inc., Morris Township, Morris County, N.J.

[21] Appl. No.: 907,945

[22] Filed: Jul. 2, 1992

[51] Int. Cl.$^5$ .............................................. G01S 13/76
[52] U.S. Cl. ........................................ 342/39; 342/40; 342/32
[58] Field of Search ........................ 342/32, 37, 39, 40

[56] References Cited

U.S. PATENT DOCUMENTS

| | | | |
|---|---|---|---|
| 3,680,090 | 7/1972 | Bishop | 342/45 |
| 4,198,632 | 4/1980 | Bishop | 342/45 |
| 4,897,659 | 1/1990 | Mellon | 342/32 |
| 4,910,526 | 3/1990 | Donnangelo et al. | 342/455 |
| 5,075,694 | 12/1991 | Donnangelo et al. | 342/455 |
| 5,081,457 | 1/1992 | Motisher et al. | 342/40 |

*Primary Examiner*—John B. Sotomayor
*Attorney, Agent, or Firm*—Howard G. Massung

[57] ABSTRACT

A method for inhibiting responses by transponders to interrogation signals originating in the side lobes of an interrogating radar of a secondary radar system. The interrogating radar first transmits a reference signal with the highest power level of the reference signal being directed into a zone of interest to the interrogating radar. The interrogating radar then transmits a control signal having a higher power level than the reference signal in all regions of space except within the zone of interest. The control signal is of substantially longer duration than the reference signal. A transponder receives, detects and measures the peak amplitude of the reference signal and establishes a minimum trigger level (MTL) at a predetermined level below the reference signal peak. The control signal is received, detected and integrated. The peak amplitude of the integrated control signal is compared with the MTL. A transponder response is inhibited if the peak amplitude of the integrated control signal is greater than the MTL. The peak amplitude of the integrated control signal may be amplified before comparison with the MTL to increase the amount of synthetic beam sharpening provided by the method and the amount of synthetic beam sharpening provided may be controlled by the interrogating radar by delaying the start of transmission of the control signal.

10 Claims, 3 Drawing Sheets

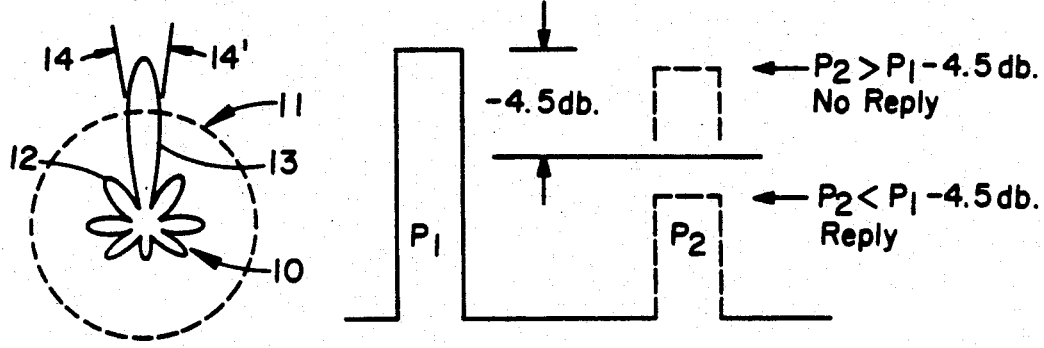
FIG. 1A
(PRIOR ART)
FIG. 1B
(PRIOR ART)
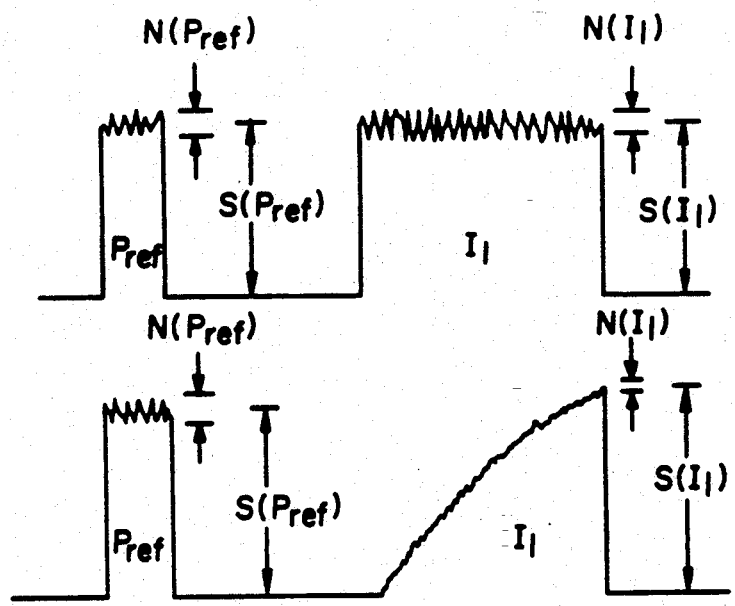
FIG. 2A
FIG. 2B

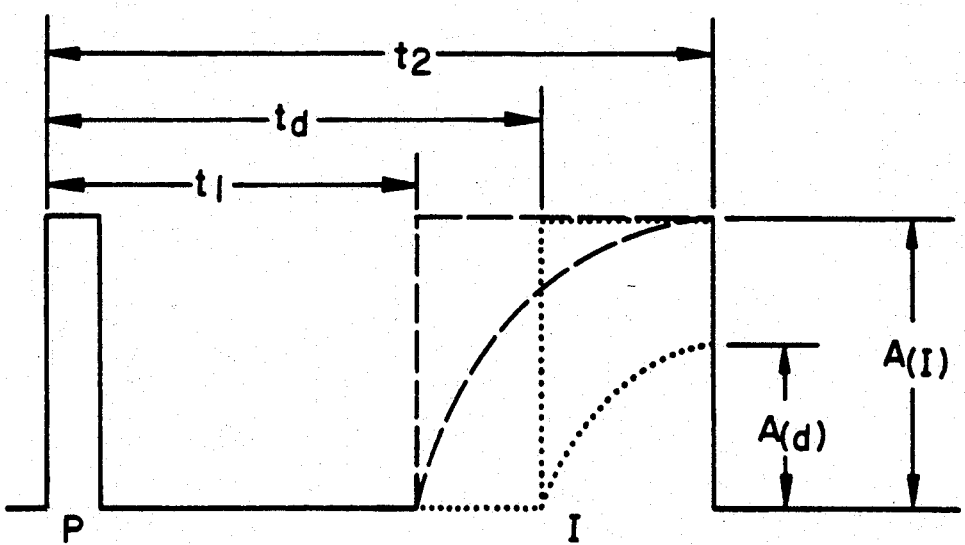
FIG. 5
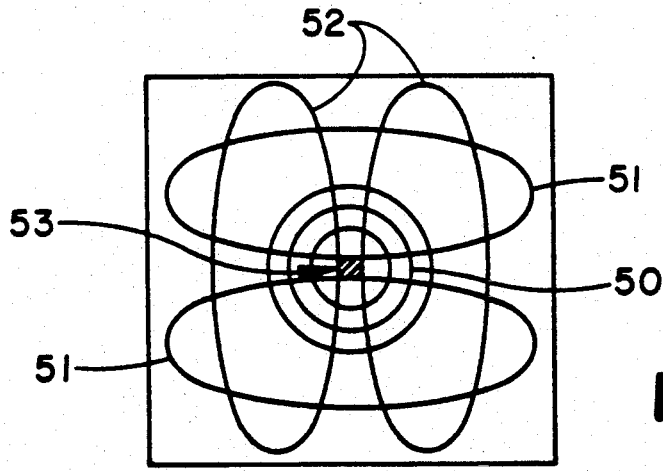
FIG. 6A
FIG. 6B
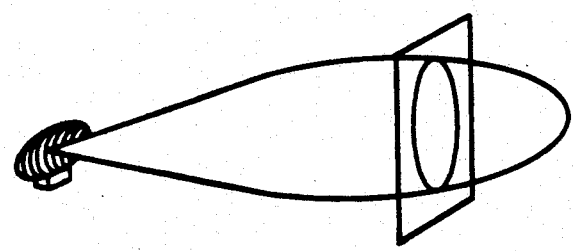

BEACON INTERROGATOR BEAMWIDTH CONTROL USING SIDELOBE SIGNAL INTEGRATION IN TRANSPONDERS

FIELD OF THE INVENTION

The present invention relates to secondary radar systems. More particularly, it relates to a method for suppressing undesired responses by a transponder beacon to interrogation signals originating in the side lobes of the antenna pattern of the interrogating radar. The invention further relates to a method for synthetically sharpening the beamwidth of the main beam of the antenna pattern of an interrogating radar whereby the angular resolution of the interrogating radar is improved.

BACKGROUND OF THE INVENTION

Secondary radar systems are used in the internationally standardized Air Traffic Control Radar Beacon System (ATCRBS) and in military Identification, Friend or Foe (IFF) systems for the advantages offered in providing surveillance radars with much stronger target signal returns, reduced ground clutter and weather return problems, positive identification of targets, and for the capability of exchanging data between an interrogating station and a responding station. In ATCRBS, for example, a ground-based interrogating radar repeatedly transmits, during azimuth scans of its antenna, either or both, identity and altitude interrogation signals. Any transponder equipped aircraft receiving the interrogation signals responds appropriately by transmitting its identification code or the altitude at which it is flying.

The transponder must respond only to interrogation signals originating in the main lobe of the interrogating radar beam, otherwise the angular resolution of the interrogating radar will be seriously degraded. The Sidelobe Suppression System (SLS) is a method in widespread use in conjunction with ATCRBS for inhibiting transponder responses to side lobe interrogations.

In the SLS, a first pulse $P_1$ of an interrogation signal is transmitted by the scanning directional antenna of the interrogating radar. At a fixed time after transmission of pulse $P_1$, a control pulse $P_2$ is transmitted by an omnidirectional antenna at a power level that is less than the power level of the main beam of the directional antenna but that is greater than the power level of all side lobes of the directional antenna. After transmission of pulse $P_2$, a third pulse $P_3$ is transmitted by the directional antenna. The spacing between pulses $P_1$ and $P_3$ determines the type of interrogation, i.e., whether information on identity or on altitude is sought. The amplitudes of pulses $P_1$ and $P_2$ are compared by the transponder and unless the amplitude of $P_1$ exceeds the amplitude of $P_2$ by a specified amount, typically 9 dB, a reply by the transponder to the interrogation is suppressed.

Further details of ATCRBS and the side lobe suppression system used therein are given in the publication "Radar Handbook", M. I. Skolnik, ed., pp. 38-1 ff., McGraw-Hill Book Co., 1970.

Certain military IFF systems use an Interrogation Sidelobe Inhibit (ISLI) feature together with a monopulse antenna for preventing undesired responses by transponders to interrogation signals. The radiating elements for one plane of the antenna, say the azimuth plane, are fed in phase with a reference pulse $P_{ref}$ producing a sum beam azimuth pattern. Then the radiating elements lying on opposite sides of the center of the azimuth plane of the antenna are fed with equal amplitude control pulses $I_1$ in phase opposition, producing a difference beam antenna pattern. The difference beam antenna pattern is superimposed upon the sum beam antenna pattern in space so that the amplitude of pulse $I_1$ will exceed the amplitude of pulse $P_{ref}$ at all azimuth bearings except those lying between the crossover points of the sum and difference antenna patterns. As in SLS, the peak amplitudes of the $P_{ref}$ and $I_1$ pulses are compared at the transponder to determine whether the interrogation signal originated in the main beam or in a side lobe of the sum antenna pattern of the interrogating radar.

Pulse $I_1$ can be transmitted at a higher power level to narrow the portion of the main lobe of the sum beam pattern lying between the crossover points of the sum and difference antenna patterns. Such a reduction of the width of the beam of the interrogating radar to which a transponder will reply is referred to as synthetic beam sharpening.

It is an object of the present invention to provide a method for inhibiting responses by a transponder to side lobe interrogations that will the reduce the effects of noise in the amplitude comparison process which determines whether the transponder will reply to an interrogation signal.

It is another object of the invention to provide a method applicable to IFF systems using monopulse antennas that permits synthetic beam sharpening in an amount controllable by the interrogating radar without requiring an increase in the power level of the control pulses transmitted therein.

SUMMARY OF THE INVENTION

Briefly, the method of the invention involves in SLS-type systems:

Transmitting a reference pulse $P_{ref}$ by the scanning directional antenna of the interrogating radar.

Transmitting a control pulse $I_1$ by an omnidirectional antenna of the interrogating radar, the control pulse being transmitted at a power level that is greater than the power level of the transmissions originating in all side lobes of the directional antenna and being of longer duration than is customarily used in conventional SLS systems.

Measuring the peak amplitude of pulse $P_{ref}$ received by the transponder.

Integrating pulse $I_1$ at the transponder, beginning at the expected arrival time of $I_1$ and continuing for the duration of $I_1$.

Comparing at the transponder the peak amplitudes of pulse $P_{ref}$ and integrated pulse $I_1$, and Replying by the transponder to an interrogation signal only if the peak amplitude of pulse $P_{ref}$ exceeds the peak amplitude of integrated pulse $I_1$ by a predetermined amount.

In IFF systems using monopulse antennas, the method of the invention involves:

Transmitting a reference pulse $P_{ref}$ on the sum antenna pattern of the interrogating radar.

Transmitting a control pulse $I_1$ on the difference antenna pattern of the interrogating radar, the control pulse being transmitted at a predetermined time after the transmission of the reference pulse and being of a longer duration than is customarily used in conventional monopulse IFF systems.

Measuring the peak amplitude of pulse $P_{ref}$ received by the transponder.

Integrating at the transponder pulse $I_1$, beginning at the expected arrival time of pulse $I_1$ and continuing for the expected duration of pulse $I_1$.

Comparing at the transponder the peak amplitudes of pulse $P_{ref}$ and integrated pulse $I_1$; and Replying by the transponder to an interrogation signal only if the peak amplitude of pulse $P_{ref}$ exceeds the peak amplitude of integrated pulse $I_1$ by a predetermined amount.

The method is applicable to monopulse IFF systems that generate a conical beam. The reference pulse $P_{ref}$ is transmitted by the interrogating radar on the sum antenna patterns for both the azimuth and elevation planes. A first control pulse $I_1$ is transmitted on the azimuth difference antenna pattern and, at a predetermined time after termination of control pulse $I_1$, a second control pulse $I_2$ is transmitted on the elevation difference antenna pattern.

At the transponder, the peak amplitude of $P_{ref}$ is measured for both the azimuth and elevation sum antenna patterns. Control pulses $I_1$ and $I_2$ are separately integrated and the peak values of integrated pulses $I_1$ and $I_2$ are respectively compared with the peak values of $P_{ref}$ for the azimuth and for the elevation sum patterns. Unless the amplitude of $P_{ref}$ exceeds the amplitude of each of integrated $I_1$ and $I_2$ by a predetermined amount, a reply by the transponder is inhibited.

The method of the invention has the added advantage of permitting the interrogating radar to control the amount of synthetic beam sharpening afforded without requiring alteration of the transponder characteristics. Such control of beam sharpening is accomplished by transmitting a control pulse of shorter duration than is specified for maximum beam sharpening.

DESCRIPTION OF THE DRAWINGS

FIG. 1A is a polar diagram of the directional antenna pattern and the omnidirectional antenna pattern of a prior art interrogating radar.

FIG. 1B is a waveform showing the operation of the Sidelobe Suppression System of the prior art.

FIG. 2A is a waveform diagram showing the noise levels of the reference pulse and control pulse used in the invention.

FIG. 2B is a waveform diagram showing the reduction in the noise level of the control pulse provided by integration of the control pulse.

FIG. 5 is a waveform diagram showing control of the amount of synthetic beam sharpening afforded by the invention by delaying the start of the control pulse.

FIG. 6A is an antenna pattern of a conical beam of a monopulse interrogating radar plotted on a plane normal to the axis of the beam; and FIG. 6B is a pictorial representation of a conical beam of a monopulse radar showing the orientation of the plane upon which FIG. 6A is plotted.

DETAILED DESCRIPTION OF THE INVENTION

Figure 3:
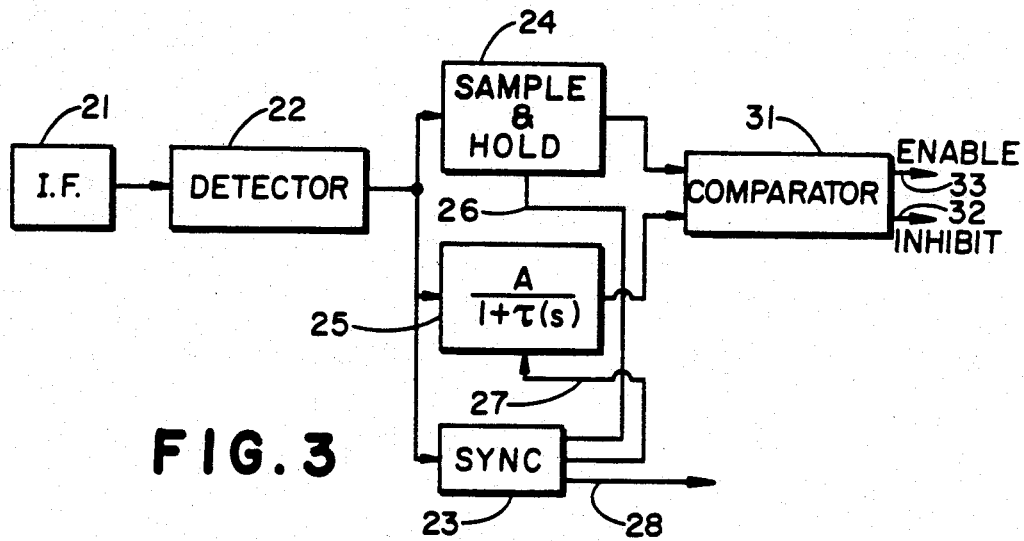
FIG. 3 is a block diagram of the portion of a transponder providing Interrogation Side Lobe Inhibit (ISLI) action.

FIG. 1A is a polar diagram of the antenna pattern 10 of the directional antenna and the antenna pattern 11 of the omnidirectional antenna used in the Sidelobe Suppression System (SLS) of the prior art. Referring to FIG. 1B, a reference pulse $P_1$ is transmitted by the directional antenna of the interrogating radar which produces a signal in space having a power distribution as shown by antenna pattern 10. At a predetermined time after transmission of pulse $P_1$, a control pulse $P_2$ is transmitted by the omnidirectional antenna of the interrogating radar, producing a signal in space having a power distribution as shown by antenna pattern 11. In conventional systems, pulses $P_1$ and $P_2$ are of the same time duration.

At the transponder, the peak amplitude of pulse $P_1$ is detected and, in this example, a reply threshold of $-4.5$ dB is set. At the expected time of arrival, the peak amplitude of pulse $P_2$ is detected and compared with the reply threshold. If the amplitude of $P_2$ is greater than the reply threshold, a reply by the transponder to an interrogation is suppressed. If the amplitude of $P_2$ is less than the reply threshold, the transponder will respond according to the nature of the interrogation, which is determined by the time spacing between pulse $P_1$ and a third pulse $P_3$ (not shown).

As shown by FIG. 1A, pulse $P_2$ is transmitted at a power level that is greater than the power level of all side lobes 12 of the directional antenna and that is less than the power level of the main beam 13 of the directional antenna within the sector 14-14'. Accordingly, only transponders located within the sector 14-14' will respond to an interrogation signal while replies by transponders located outside sector 14-14' will be suppressed.

In practice, a minimum triggering level (MTL) is established which requires that the amplitude of pulse $P_1$ must be greater than the amplitude of pulse $P_2$ by the amount of the MTL, otherwise a reply by the transponder will be suppressed. FIG. 1A is a waveform diagram showing pulses $P_1$ and $P_2$ and an MTL of $-4.5$ dB As the amplitude of $P_2$ approaches the MTL, the signal to noise (S/N) ratio of $P_2$ has increasing significance in determining whether a reply by a transponder will be suppressed or permitted. When noise levels are high, transponder responses may be permitted where responses would be suppressed under low noise conditions. Lower S/N ratios of the $P_2$ control pulses therefore result in erratic variations of the effective beam width, i.e., the width of sector 14-14', of the interrogating radar.

FIG. 2A is a waveform diagram of a reference pulse $P_{ref}$ and a control pulse I transmitted by either an SLS or an ISLI type of interrogating radar. If the radar is of the SLS type, $P_{ref}$ is transmitted by the directional antenna and $I_1$ is transmitted by the omnidirectional antenna. If the radar is of the ISLI type, $P_{ref}$ is transmitted by the sum antenna pattern and $I_1$ is transmitted by the difference antenna pattern. In accordance with the invention, pulse $I_1$ is of substantially longer duration than pulse $P_{ref}$, suitably ten times longer in duration. The signal to noise ratios of pulses $P_{ref}$ and $I_1$ are not changed by the increase in the length of pulse $I_1$. That is:

$$\frac{S(P_{ref})}{N(P_{ref})} = \frac{S(I_1)}{N(I_1)}$$

FIG. 2B is a waveform diagram showing pulses $P_{ref}$ and $I_1$ after integration of pulse $I_1$, in accordance with the invention. When pulse $I_1$ is integrated in an integrator having a transfer function in the form of:

$$\frac{1}{1 + \tau(s)}$$

where:

$\tau$ is the integrator time constant; and
s is the differential operator d/dt;

When the integrator time constant $\tau$ is made equal to the time duration of pulse $I_1$, the noise bandwidth of pulse $I_1$ is reduced approximately in the ratio of:

$$\frac{\text{Pulse width }(P_{ref})}{\text{Pulse width }(I_1)}$$

In this example, the pulse width of $I_1$ has been selected to be ten times greater than the pulse width of $P_{ref}$. Consequently, the signal to noise ratio of $I_1$ is 10 dB greater than the signal to noise ratio of $P_{ref}$. That is:

$$\frac{S(I_1)}{N(I_1)} = \frac{S(P_{ref})}{N(P_{ref})} + 10 \text{ db.}$$

The improvement in the signal to noise ratio of the control pulse $I_1$ results in more stable and predictable boundaries of the zones in which transponder responses will be triggered and in which transponder responses will be inhibited.

FIG. 3 is a block diagram of the ISLI portion of a transponder. The transponder includes an r.f. amplifier, local oscillator, and mixer, none of which are shown, and an i.f. amplifier 21. The output of i.f. amplifier 21 is detected in a video detector 22 and the video output thereof is supplied to a synchronizer 23, a sample and hold circuit 24, and an integrator 25. Synchronizer 23 utilizes the pulse $P_{ref}$ transmitted by the interrogating radar to establish a time reference from which times are measured for furnishing enabling signals on line 26 to sample and hold 24, on line 27 to integrator 25, and on line 28 to other circuits requiring synchronization, such as a decoder (not shown) for decoding interrogation signals. The transponder may be synchronized the interrogating radar by means other than pulse $P_{ref}$. For example, $P_{ref}$ may be preceded by one or more synchronizing pulses.

At the appropriate time, normally near the end of $P_{ref}$, synchronizer 23 enables sample and hold 24 to receive and retain the peak amplitude of $P_{ref}$. Then, at a predetermined time after the end of $P_{ref}$, synchronizer 23 enables integrator 25 to receive and commence integrating pulse $I_1$. Integration of $I_1$ continues for the duration of $I_1$. Integrator 25 may suitably have a transfer function in the form of:

$$\frac{A}{1 + \tau(s)}$$

where A is the gain of the integrator and $\pi$ is the integrator time constant.

If $\pi$ is made equal to the duration of pulse $I_1$ to obtain a 10 dB improvement in the S/N ratio of $I_1$, as explained above, Integrator 25 will charge to a peak value of about 63% of the peak value of $I_1$ before integration. The gain factor A of integrator 25 may be selected so that the peak value of integrated pulse $I_1$ equals the peak value of $I_1$ before integration. Alternatively, $\tau$ may be made smaller than the duration of $I_1$, providing less improvement in the S/N ratio of $I_1$, but requiring a smaller value of A to equalize the peak values of $I_1$ before and after integration. Also, the amplification factor A of integrator 25 may be selected to provide a higher peak value of $I_1$ after integration than the peak value of $I_1$ before integration. Selection of the amplification factor A to provide the higher peak value for integrated pulse $I_1$ permits the interrogating radar to control the amount of synthetic beam sharpening afforded in the system, as is explained below.

The peak value of $P_{ref}$ from sample and hold 24 is compared with the peak value of integrated pulse $I_1$ from integrator 25 in a comparator 31. Comparator 31 establishes a minimum trigger level (MTL) at a predetermined level below the peak value of $P_{ref}$. If the peak value of integrated pulse $I_1$ is greater than the MTL of comparator 25, comparator 25 generates an inhibit signal on line 32 to inhibit response by the transponder to an interrogation signal associated with the particular $P_{ref}$ undergoing comparison. If the peak value of integrated pulse $I_1$ is below the MTL of comparator 25, comparator 25 generates an enable signal on line 33 that enables response by the transponder to the interrogation signal to follow.

The method of the invention allows the amount of synthetic beam sharpening afforded by the system to be controlled by the interrogating radar. Control of the effective beam width of the interrogating radar is desirable where the radar is scanning an area both at short ranges and at extended ranges. A wider effective beam width is preferred for scans at short ranges, while a narrower effective beam width is desirable for scans at longer ranges. The method is applicable to control of the effective beam width of both SLS and ISLI types of systems. Such control is best illustrated, however, in connection with an ISLI monopulse radar.

Figure 4:
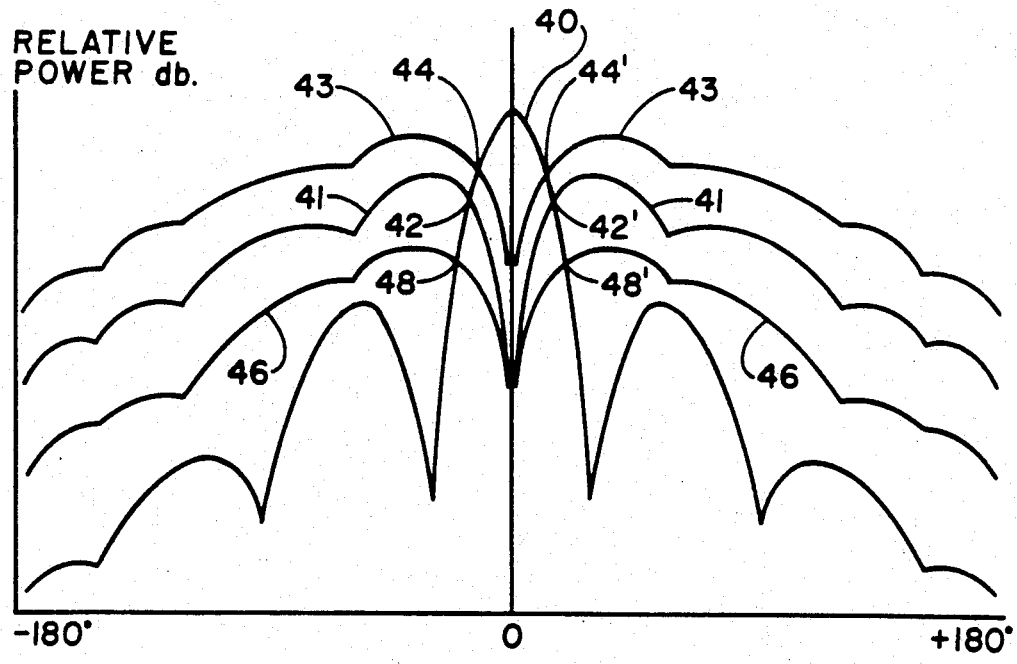
FIG. 4 is a plot in cartesian coordinates of the sum and difference antenna patterns of a monopulse interrogating radar.

FIG. 4 is a plot in cartesian coordinates of the sum antenna pattern 40 and the difference antenna pattern 41 of a monopulse radar. In accordance with the invention, pulse $P_{ref}$ is transmitted on the sum antenna pattern 40 and pulse $I_1$ is transmitted on the difference antenna pattern 41. When the amplification factor A of integrator 25 (FIG. 3) of the transponder is selected to produce a peak amplitude for pulse $I_1$ equal to the peak amplitude of pulse $I_1$ before integration, the effective beam width of the interrogating radar lies between the crossover points 42-42' of sum antenna pattern 40 and difference antenna pattern 41. When the amplification factor A of integrator 25 is selected to provide a peak amplitude for integrated pulse $I_1$ that is greater than the peak amplitude of pulse $I_1$, the difference antenna pattern, as interpreted by the transponder, has the form shown by difference pattern 43. The effective beam width of the interrogating radar then lies between the crossover points 44-44', sharpening the beam. Conversely, when the amplification factor A of integrator 25 is selected to produce a smaller peak amplitude for integrated pulse $I_1$ than the peak amplitude of $I_1$ before integration, the difference antenna pattern, as seen by the transponder, has the form shown by difference pattern 46 and the effective beam width of the interrogating radar is broadened to the sector lying between the crossover points 48-48'.

In practice, the amplification factor A of integrator 25 is not varied to achieve control of the effective beam width of the interrogating radar. Instead, the value of A for all transponders operating within the system is fixed at the higher value producing the difference pattern 43 and the greatest amount of synthetic beam sharpening. The effective beam width of the interrogating radar is then controlled at the radar by delaying the start of pulse $I_1$ while the transponders continue to integrate $I_1$ during the predetermined time period assigned to the integration of full length $I_1$ pulses.

Control of the effective beam width of the interrogating radar by delaying the start of control pulse $I_1$ is illustrated by the waveform diagram of FIG. 5, to which reference is now made. For maximum beam sharpening, reference pulse $P_{ref}$ is transmitted on the sum antenna pattern 40 (FIG. 4) of the interrogating radar. At the predetermined time $t_1$, transmission of control pulse $I_1$ is begun and continued until time $t_2$, using the difference antenna pattern 41. Integrated pulse $I_1$ then has a peak value of $A(I)$. By virtue of the higher value selected for the amplification factor A of integrator 25, control pulse $I_1$ appears to the transponders as having been transmitted on difference antenna pattern 43, providing maximum beam sharpening. For a broader effective beam width, the interrogating radar delays the start of control pulse $I_1$ until time $t_d$ and terminates transmission of $I_1$ at time $t_2$. Transponders integrate the delayed $I_1$ pulse over the same interval $t_1$-$t_2$, resulting in a peak amplitude of $A(d)$ for integrated pulse $I_1$. The transponders interpret the control pulse $I_1$ as having been transmitted on a difference antenna pattern intermediate between difference patterns 43 and 46 of FIG. 4, resulting in a broadened effective beam width of the interrogating radar. The peak amplitude $A(d)$ of integrated pulse $I_1$ is dependent upon the amount by which the start of transmission of $I_1$ is delayed and is given approximately by the relationship:

$$A(d) \propto A(I)\left(\frac{t_2 - t_d}{t_2 - t_1}\right)$$

The description of the invention has thus far proceeded on the assumption that pattern the main beam of the interrogating radar is highly directive in the azimuth plane and fan-shaped in the elevation plane, which is the most frequently encountered case. The invention is not restricted to interrogating radars transmitting a fan-shaped beam. In systems of the SLS-type, as described with reference to FIG. 1, in which the interrogating radar transmits a conical beam, improved suppression of responses to side lobe interrogations can be obtained by incorporating the following modifications in the method.

A reference pulse $P_{ref}$ is transmitted by the directive antenna of the interrogating radar. At a first predetermined time after transmission of pulse $P_{ref}$, a first control pulse $I_1$ is transmitted by the omnidirectional antenna of the interrogating radar. At a second predetermined time after termination of pulse $I_1$, a second control pulse $I_2$ is transmitted by the omnidirectional antenna. Control pulses $I_1$ and $I_2$ are of the same duration and are transmitted at the same power levels, greater than the power levels of all side lobes of the directive antenna.

Transponders operating in the system are modified to include both a first and a second integrator. The first integrator is enabled at the expected arrival time of pulse $I_1$ and operates for the duration of $I_1$. The second integrator is enabled at the expected arrival time of pulse $I_2$ and operates for the duration of $I_2$. The peak values of integrated pulses $I_1$ and $I_2$ are added together and are compared to the minimum trigger level (MTL), which is set below the MTL that would be used if only a single control pulse were transmitted. For example, if the MTL for a single control pulse was set at $-10$ dB below the peak value of $P_{ref}$, the MTL would be set at $-13$ dB when two control pulses are used. A transponder reply is suppressed if the sum of the peak values of integrated pulses $I_1$ and $I_2$ is greater than the MTL.

In ISLI-type systems using a monopulse interrogating radar to transmit a conical beam, the method is capable of providing synthetic beam sharpening in both the azimuth and elevation planes of the main beam of the radar. FIG. 6A is a simplified antenna pattern taken on a plane normal to the axis of the main beam of a monopulse radar. FIG. 6B is a pictorial representation of the radar beam showing the orientation of the plane of FIG. 6A. The sum antenna pattern 50 of the combined azimuth and elevation planes appears in FIG. 6A as a series of concentric circular contours of progressively lower power levels. For simplicity of illustration, only a single contour, say the $-6$ dB contour, of the elevation difference pattern 51 and the $-6$ dB contour of the azimuth difference pattern 52 is shown. Several variations of the method of the invention may be used for ISLI and synthetic beam sharpening purposes.

Reference pulse $P_{ref}$ is transmitted simultaneously on the azimuth and elevation sum antenna patterns of the interrogating radar. At the predetermined time after termination of $P_{ref}$, control pulse $I_1$ is simultaneously transmitted by the interrogating radar on the azimuth difference pattern 52 and the elevation difference pattern 51.

Pulse $P_{ref}$ is received at the transponder, detected and the peak value thereof is measured to establish an MTL. $I_1$ is received, detected, and integrated, and the peak value of integrated pulse $I_1$ is compared with the MTL. If the peak value of integrated pulse $I_1$ is greater than the MTL, response by the transponder is inhibited. Transponders located within the area 53 of FIG. 6A will respond to an interrogation signal while responses by transponders located outside area 53 will be inhibited.

In modifications of the method for use with a monopulse interrogating radar transmitting a conical beam, the transponders of the system are equipped with two integrators and the interrogating radar transmits a reference pulse $P_{ref}$ simultaneously on the azimuth and elevation sum antenna patterns. Control pulse $I_1$ may be transmitted on the difference antenna pattern for one plane, say the azimuth difference pattern 52, and control pulse $I_2$ transmitted on the elevation difference antenna pattern 51. The transponder establishes an MTL, suitably at $-6$ dB, based on the peak amplitude of $P_{ref}$, separately integrates $I_1$ and $I_2$, and individually compares the peak amplitudes of integrated $I_1$ and $I_2$ with the MTL. If either of the compared values of $I_1$ or $I_2$ exceed the MTL, response is inhibited. In a variation, the peak values of integrated $I_1$ and $I_2$ may added together and the sum compared with an MTL of −9 dB to determine whether response is to be inhibited.

In still another variation, control pulse $I_1$ is transmitted simultaneously on both the elevation difference pattern 51 and the azimuth difference pattern 52. At the assigned time, control pulse $I_2$ is transmitted simultaneously on both the elevation difference pattern and the azimuth difference pattern. Pulses $I_1$ and $I_2$ are separately integrated at the transponder and the peak values of integrated $I_1$ and $I_2$ are individually compared with an MTL of −6 dB, for example, and the sum of the peak values of integrated $I_1$ and $I_2$ is compared with a lower MTL, −9 dB, for example. If any of the values of integrated $I_1$ and $I_2$ exceed the MTL with which they are compared, response by the transponder is inhibited.

Obviously, other variations in the method of the invention are possible in the light of the above teachings. It is therefore to be understood that the invention may be practiced otherwise than as specifically disclosed without departing form the spirit and scope of the appended claims.

The invention claimed is:

1. A method for inhibiting response to interrogation signals by certain transponders in a secondary radar system having a plurality of transponders and an interrogating radar, where the transponders whose responses are to be inhibited are locate outside of a zone of interest to the interrogating radar, comprising the steps of:
  transmitting a reference signal $P_{ref}$ by said interrogating radar, said $P_{ref}$ signal being transmitted into said zone of interest at a power level that exceeds the power level of said $P_{ref}$ signal in all regions of space outside said zone of interest;
  transmitting a control signal $I_1$ by said interrogating radar at a predetermined time after transmission of said $P_{ref}$ signal, said $I_1$ signal being transmitted at a power level that exceeds the power level of said $P_{ref}$ signal in all regions of space outside said zone of interest but that is lower than the power level of said $P_{ref}$ signal within said zone of interest;
  receiving and detecting said $P_{ref}$ signal at a transponder;
  measuring the peak amplitude of said detected $P_{ref}$ signal;
  establishing a minimum trigger level at a predetermined value below said measured peak amplitude of said detected $P_{ref}$ signal;
  receiving and detecting said $I_1$ signal at said transponder;
  integrating with respect to time said detected $I_1$ signal over the period of said detected $I_1$ signal; measuring the peak amplitude of said integrated $I_1$ signal;
  comparing said peak amplitude of said integrated $I_1$ signal with said minimum triggering level; and
  inhibiting a response by said transponder to an interrogation signal transmitted by said interrogating radar whenever said peak amplitude of said integrated $I_1$ signal is greater than said minimum triggering level.

2. A method as claimed in claim 1, wherein said control signal $I_1$ is transmitted by said interrogating radar for a substantially longer period than the period of transmission of said reference signal $P_{ref}$.

3. A method as claimed in claim 2, wherein a directive antenna is used in performing said step of transmitting a reference signal $P_{ref}$ and an omnidirectional antenna is used in performing said step of transmitting a control signal $I_1$.

4. A method as claimed in claim 2, wherein said interrogating radar is a monopulse radar having sum and difference antenna patterns, and wherein said step of transmitting a reference signal $P_{ref}$ is performed using said sum antenna pattern and said step of transmitting a control signal $I_1$ is performed using said difference antenna pattern.

5. A method as claimed in claim 2, wherein said step of integrating with respect to time said detected $I_1$ signal includes the steps of:
  applying said detected $I_1$ signal to an integrator circuit having a transfer function in the form of:

$$\frac{A}{1 + \tau(s)}$$

where:
  A is the amplification factor of said integrator circuit,
  $\tau$ is the time constant of said integrator circuit, and
  s is the differential operator d/dt;
  enabling operation of said integrator circuit at the expected arrival time at said transponder of said $I_1$ signal; and
  terminating operation of said integrating circuit at a predetermined time after said integrating circuit is enabled, the value of the output of said integrator circuit at the time of said termination being said peak value of said integrated $I_1$ signal.

6. A method as claimed in claim 5 wherein the value of the amplification factor A of said integrator circuit is selected so that said peak value of said integrated $I_1$ signal is greater than the peak value of said detected $I_1$ signal.

7. A method as claimed in claim 6 wherein the volume of space occupied by said zone of interest to said interrogating radar can been enlarged a controllable amount by modifying said step of transmitting a control signal $I_1$, said modification comprising:
  delaying the start of transmitting a control signal $I_1$ until a selected amount of time after said predetermined time after transmission of said $P_{ref}$ signal, the extent of said enlargement of said zone of interest being proportional to the length of said selected amount of time.

8. A method for inhibiting response to interrogation signals by certain transponders in a secondary radar system having a plurality of transponders and an interrogating radar, where the transponders whose responses are to be inhibited are located outside of a zone of interest to the interrogating radar, comprising the steps of:
  transmitting a reference signal $P_{ref}$ by said interrogating radar, said $P_{ref}$ signal being transmitted into said zone of interest at a power level that exceeds the power level of said $P_{ref}$ signal in all regions of space outside said zone of interest;
  transmitting a first control signal $I_1$ by said interrogating radar at a first predetermined time after transmission of said $P_{ref}$ signal, said $I_1$ signal being transmitted at a power level that exceeds the power level of said $P_{ref}$ signal in all regions of space outside said zone of interest but that is lower than the power level of said $P_{ref}$ signal within said zone of interest;
  transmitting a second control signal $I_2$ by said interrogating radar at a second predetermined time after transmission of said $P_{ref}$ signal, said $I_2$ signal being transmitted at a power level that exceeds the power level of said $P_{ref}$ signal in all regions of space outside said zone of interest but that is lower than the power level of said $P_{ref}$ signal within said zone of interest;

receiving and detecting said $P_{ref}$ signal at a transponder;

measuring the peak amplitude of said detected $P_{ref}$ signal;

establishing a minimum trigger level at a predetermined value below said measured peak amplitude of said detected $P_{ref}$ signal;

receiving and detecting said $I_1$ signal at said transponder;

integrating with respect to time said detected $I_1$ signal over the period of said detected $I_1$ signal;

receiving and detecting said $I_2$ signal at said transponder;

integrating with respect to time said detected $I_2$ signal over the period of said detected $I_2$ signal;

measuring the peak amplitude of said integrated $I_2$ signal;

individually comparing said peak amplitudes of said integrated $I_1$ signal and said integrated $I_2$ signal with said minimum triggering level; and inhibiting a response by said transponder to an interrogation signal transmitted by said interrogating radar whenever said peak amplitude of either said integrated $I_1$ signal or said integrated $I_2$ signal is greater than said minimum triggering level.

9. A method as claimed in claim 8 wherein said interrogating radar is a monopulse radar that transmits a conical beam, said interrogating radar having an antenna producing a sum antenna pattern and a difference antenna pattern in the azimuth plane and a sum antenna pattern and a difference in the elevation plane, wherein:

said step of transmitting a reference signal $P_{ref}$ is performed using simultaneously said sum antenna pattern in the azimuth plane and said sum antenna pattern in the elevation plane;

said step of transmitting a first control signal $I_1$ is performed using simultaneously said difference antenna pattern in the azimuth plane and said difference antenna pattern in the elevation plane; and said step of transmitting a second control signal $I_2$ is performed using simultaneously said difference antenna pattern in the azimuth plane and said difference antenna pattern in the elevation plane.

10. A method as claimed in claim 8 wherein said interrogating radar is a monopulse radar that transmits a conical beam, said interrogating radar having an antenna producing a sum antenna pattern and a difference antenna pattern in the azimuth plane and a sum antenna pattern and a difference in the elevation plane, wherein:

said step of transmitting a reference signal $P_{ref}$ is performed using simultaneously said sum antenna pattern in the azimuth plane and said sum antenna pattern in the elevation plane;

said step of transmitting a first control signal $I_1$ is performed using one of said difference antenna patterns in one of said planes; and said step of transmitting a second control signal $I_2$ is performed using the other of said difference antenna patterns in the other of said planes.

* * * * *